Sept. 15, 1964  G. I. BLOOMQUIST ETAL  3,148,636
SERVING TRAY
Filed Nov. 13, 1961  2 Sheets-Sheet 1
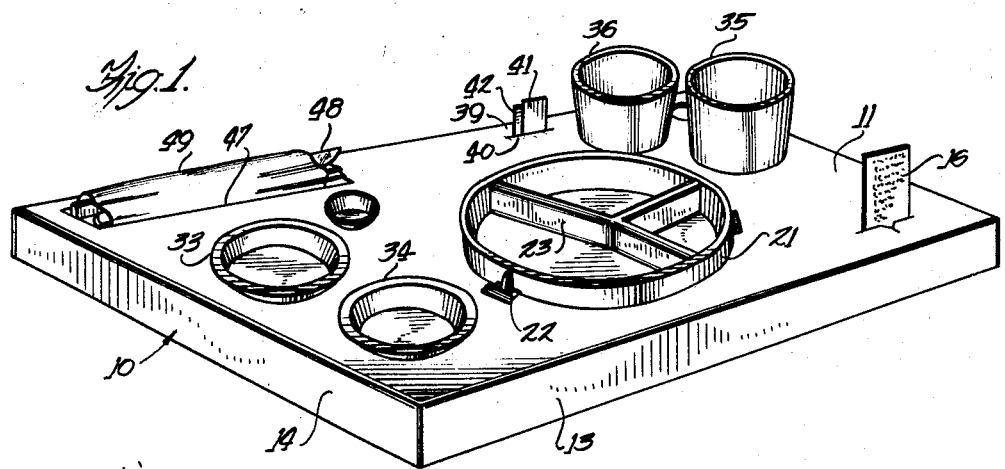
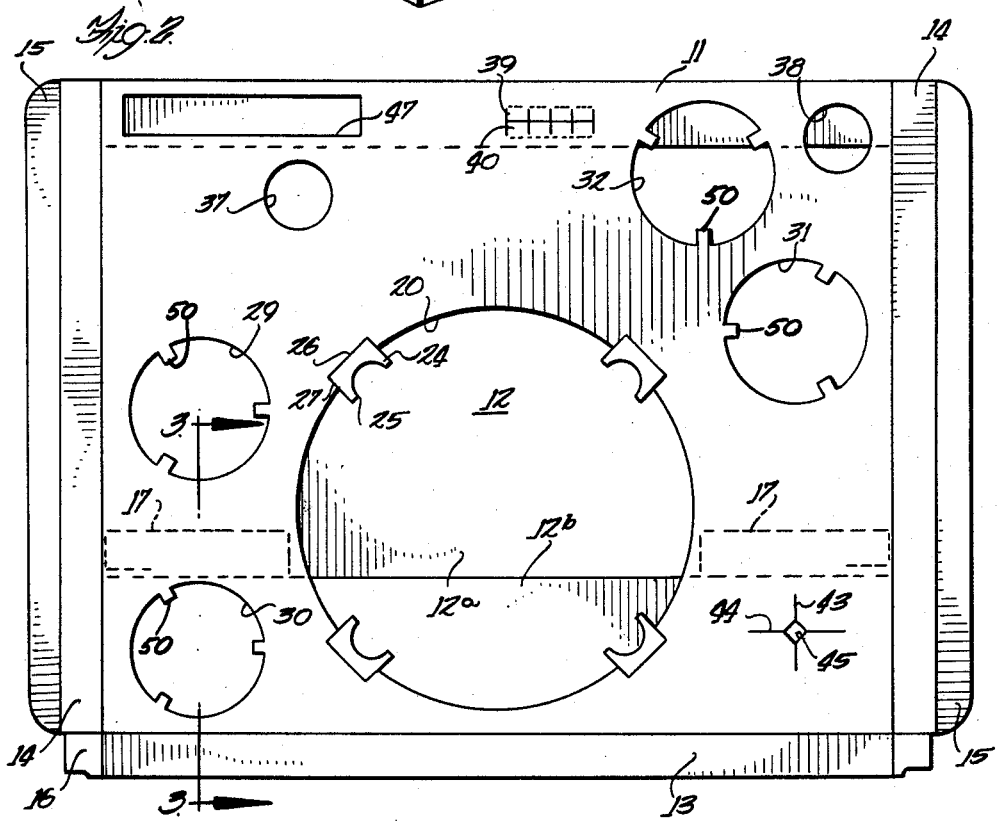

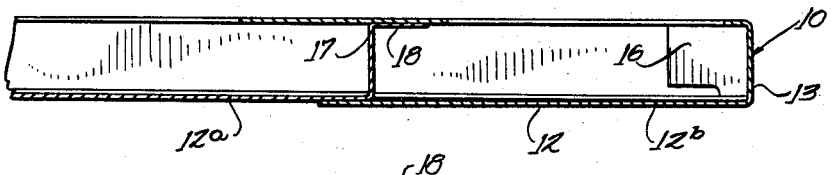

United States Patent Office 3,148,636
Patented Sept. 15, 1964

3,148,636
SERVING TRAY
George I. Blomquist, Rockville, Md., and John A. Johnson, Evanston, Ill., assignors to American Hospital Supply Corporation, Evanston, Ill., a corporation of Illinois
Filed Nov. 13, 1961, Ser. No. 151,744
7 Claims. (Cl. 108—26)

This invention relates to a serving tray, and more specifically, to a food serving tray which is disposable after use and which is therefore particularly suitable for use in hospitals and institutions where precautions must be taken to prevent the spread of infection and contagious disease.

An important object of the present invention is to provide a disposable or incinerable food serving tray which is of sturdy construction and which is suitable for supporting the relatively heavy ovenware dishes commonly used in institutional meal service. Another object is to provide a tray formed from a single sheet of cardboard which is of sturdy reinforced construction and which is therefore well suited to support such ovenware dishes without sagging, bending or tearing. A further object is to provide such a tray which will accommodate dishes of various sizes in the same opening and which is provided with means for securely holding such dishes in place, even where a large dish is removed and a smaller dish is substituted therefor.

Another object is to provide a disposable tray server in which an entree dish or plate is firmly supported against vertical, lateral and rotational movement. A still further object is to provide a tray in which the means for restraining dish rotation and lateral movement is cooperable with dishes of a variety of sizes. An additional object is to provide a disposable tray which may be readily prepared for use and which is provided with means for receiving and retaining diet cards, condiment envelopes, utensils, cups, dishes and other containers.

Another object is to provide a disposable serving tray which may be shipped and stored in collapsed condition and which may be readily folded and prepared for use. A specific object is to provide such a serving tray in which an internal support is automatically moved into a reinforcing position and is locked in that position as the tray is prepared for use.

Other objects will appear from the specification and drawings in which:

FIGURE 1 is a perspective view of the serving tray showing utensils, containers and cards supported thereby;

FIGURE 2 is a top plan view of the tray in flattened condition for shipping and storage;

FIGURE 3 is an enlarged cross sectional view taken along line 3—3 of FIGURE 2;

FIGURE 4 is a cross sectional view similar to FIGURE 3 but showing the tray in erected condition;

FIGURE 5 is a broken perspective view illustrating one of the tray's inner reinforcing partitions;

FIGURE 6 is a broken perspective view showing the structural relationship between the tray and a dish;

FIGURE 7 is a sectional view taken along line 7—7 of FIGURE 6;

FIGURE 8 is a sectional view similar to FIGURE 7 but showing the cooperative relationship between the tray and a smaller food-serving dish;

FIGURE 9 is a perspective view illustrating the relationship between the food tray and a diet card carried thereby.

In the embodiment of the invention illustrated in the drawings, the numeral 10 generally designates a serving tray having top, bottom, side and end walls 11 through 14, respectively. The tray is preferably formed from paperboard although any other sheet material having similar properties of flexibility, strength, disposability and low cost may be used. It is particularly desirable that the tray be formed from sheet material which is combustible. The tray may therefore be incinerated following use, an important advantage when such trays are used in hospitals or other institutions where there is the danger of cross infection and the spread of disease.

The tray is formed from a single sheet of material and is normally shipped and stored in the flattened or "knocked-down" condition shown in FIGURES 2 and 3. In that state, the inner surfaces of the top and bottom walls are either closely spaced or in contact with each other and the end walls 14 are spread outwardly in generally the same plane as the top wall. The end walls are provided with elongated tab extensions 15 which also lie in substantially the same plane as the top wall when the tray is flattened but which are tucked into the space between the top and bottom walls when the tray is erected. End tabs 16 provided by the side walls 13 are folded inwardly to assist in holding the end walls 14 and tab extensions 15 in place when the tray is in use, and to give the tray lateral stability (i.e., prevent collapsing of the tray into flattened condition).

Referring to FIGURES 3–5, it will be noted that the longitudinal edge portions of the single sheet of board material from which the tray is formed are joined together along the bottom of the tray so that bottom wall 12 is in effect formed in two sections 12a and 12b. The overlapping portions of the two sections may be cemented, stapled or otherwise secured together so that these sections are inseparable. Section 12a, which is partially overlapped by section 12b, is provided with a pair of integral extensions 17 which are interfolded between the top and bottom walls when the tray is flattened and which form reinforcing vertical partitions when the tray is erected. In FIGURES 4 and 5 it will be seen that each partition 17 is provided with an upper longitudinal portion 18 cemented or otherwise secured to the undersurface of the top wall. The main portion of each partition is parallel with side walls 13 and is spaced from each of those side walls to maintain the top and bottom walls of the erected tray in spaced parallel relation despite the distorting forces imposed by dishes and other articles carried by the tray.

Each partition is provided with an end notch 19 along its lower folded edge to accommodate the tab extension 15 of an end wall when the parts of the tray are folded together for use. Since the partitions extend to the fold lines between the end walls and the top wall, the abutting engagement between the ends of the partitions and the end walls when the tray is erected tends to maintain the end walls in vertical condition.

Referring to FIGURE 2, it will be seen that the partitions 17 have their inner ends terminating short of a generally circular opening 20 in the top wall. This opening is adapted to receive the lower portion of a dish 21 which, in the illustration given is provided with circumferentially spaced side projections 22 and internal partitions 23 (FIGURE 1). Opening 20 is located directly above the joined overlapping portions of bottom wall sections 12a and 12b so that the double thickness of the bottom wall will provide increased support for the dish 21 resting thereon. As already indicated, considerable reinforcement for the tray is provided by the partitions 17 which flank the dish-receiving opening 20 and which maintain the tray's top and bottom walls in uniformly spaced relation despite the weight of a dish carried principally by the tray's imperforate bottom wall.

Downward movement of a dish 21 with respect to tray 10 is thereby prevented by the dish-supporting bottom wall 12 as reinforced by the upstanding partitions 17 which connect the bottom wall to the top wall. Lateral movement of the dish is prevented by the edges of the opening 20 and by dish-engaging tabs 24 which are spaced circumferentially about the edges of the opening. Each of the tabs has a free edge 25 which is spaced within the limits of opening 20 and is pivotal along a fold line 26 spaced outwardly from the opening's edge. The tray's top wall is slitted to form the side edges 27 of each tab.

Opening 20 is adapted to receive dishes 21 of a range of sizes and its diameter is therefore as great, or slightly greater, than the largest dishes to be supported by the tray. It will be noted, however, that even where a larger dish having substantially the same size as opening 20 is supported by the tray, tabs 24 will not bend at right angles to top wall 11 because the fold line 26 for each tab is spaced outwardly from the periphery of opening 20 (FIGURE 7). Since there is only limited angular displacement of the tabs even with larger size dishes, such tabs are highly effective in preventing lateral displacement of the dish within the opening. Furthermore, this limited displacement permits recovery of the tabs into their original positions when a dish is removed from the tray and, therefore, a large dish may be removed from the opening and replaced with a smaller dish which will still be engaged and anchored by the locking tabs. This is illustrated in FIGURE 8 where a large dish 21a, used to maintain the food at serving temperature during delivery from the kitchen to the patient, is removed and the meal contained in the smaller foil liner or foil dish 21b is placed within opening 20. The resilient locking tabs 24 flex upwardly from the broken to the solid line positions to engage and hold the liner in place. It will be noted that the corners 24a and 24b of the tabs are sharp so that such corners will tend to engage the upwardly-extending side ridges or folds of the liner 21b to prevent rotation of the liner within the opening 20. The use of a disposable liner is important in the serving of foods in contagion wards and the use of such a liner has therefore been presented as one instance where a large dish would be removed from the tray and replaced by a smaller disposable dish; however, it is to be understood such substitutions might occur using smaller dishes other than liners and that such smaller dishes would also tend to be locked in place by upward return or recovery of the tabs 24.

In addition to restraining lateral movement of the dish within opening 20, tabs 24 also prevent the large lug-equipped dish from rotating. As shown most clearly in FIGURE 6, the free edge of each tab is indented at 28 to receive a lug or projection 22 of dish 21. Especially where the dish is compartmented, the prevention of dish rotation makes eating easier for a patient or other user and also makes it more convenient for members of a kitchen staff in filling the dish with food.

Referring to FIGURES 1 and 2, it will be noted that the top wall of the tray is also provided with other openings 29–32, each of which has inwardly projecting tabs 50 for gripping various sizes of containers, such as dishes 33 and 34, and glasses 35 and 36, placed therein. If desired, other openings, such as circular openings 37 and 38, may be provided without tabs in the tray's top wall.

It is believed apparent that the tabs 24 and 50 of the various openings, and particularly of the smaller openings 29–32, will be effective in centering and holding dishes in place only so long as the dishes do not sink downwardly to the full extent permitted by the sizes of those openings; otherwise, the tabs will tend to bend downwardly at such sharp angles that they will not effectively perform their gripping and locking function. Since the dishes 21, 33 and 34 all rest upon the bottom wall 12 of the paperboard tray, it is of considerable importance that the bottom wall be prevented from sagging and interfering with the proper operation of tabs 24 and 50. Partitions 17, by reinforcing bottom wall 12, thereby insure effective cooperation between all of the tabs and the dishes or other containers received within the several openings.

The condiment holder for the tray comprises two series of tabs 39 and 40 cut into the top wall 11 and arranged in direct opposition. Condiment envelopes 41 and 42 may be inserted between the opposing series or rows of tabs and are held in place by the natural resiliency or flexibility of the material from which the tray, and hence the tabs, are formed. Envelopes or packets of various sizes may be inserted between the rows of tabs, the number of tabs which are bent or flexed depending upon the width of the packets.

The tray is also provided with a holder for cards, such as diet cards or menus, in the form of a pair of crossed slots 43 and 44 and a square or diamond-shaped opening 45 in the area of intersection of those slots. The opening facilitates the insertion of a card, such as card 46, into the corner slots thereof, as illustrated most clearly in FIGURE 9. Insertion of a card into either slots 43 or 44 is easily achieved by inserting a corner of the card into opening 45, as indicated by the solid line representation of card 46, and thereafter straightening the card into the broken line position.

If desired, the top wall of the tray may also be provided with an elongated rectangular opening 47 for receiving and retaining eating utensils 48 shown in FIGURE 1 as being wrapped in a napkin 49.

While in the foregoing we have disclosed an embodiment of the invention in considerable detail for purposes of illustration, it will be understood by those skilled in the art that many of these details may be varied without departing from the spirit and scope of the invention.

We claim:

1. A serving tray formed of foldable sheet material and having top, bottom, side and end walls, said top wall having a dish-receiving opening therein and being spaced from said bottom wall, said bottom wall being formed in two sections secured together in overlapping relation along a line disposed directly beneath said opening, and at least one upstanding partition formed integrally with said bottom wall and permanently and hingedly secured to the undersurface of said top wall adjacent said opening, whereby said partition maintains said top and bottom walls in substantially uniformly spaced relation even when said bottom wall supports the weight of a dish received within said opening.

2. A serving tray folded from a single sheet of board material and having top, bottom, side and end walls, said top wall having a dish-receiving opening therein and being spaced above said bottom wall, and a pair of longitudinally-elongated upstanding partitions disposed on opposite sides of said opening and having their outer ends terminating adjacent said end walls, said partitions being hingedly and permanently connected to both said top and bottom walls and being engageable with said end walls to maintain the same at right angles with reference to said top and bottom walls, said end walls being provided with tab extensions tucked between said top and bottom walls, said partitions being notched to receive said extensions and hold the same in place.

3. In combination, a serving tray formed from foldable sheet material and having top, bottom, side and end walls, said top walls having a dish-receiving opening therein and being spaced above said bottom wall, said bottom wall being formed in two sections secured together in overlapping relation along a line disposed directly beneath said opening, at least one partition formed integrally with said bottom wall and permanently secured to the undersurface of said top wall, and a dish having the lower portion thereof received within said opening and resting upon said bottom wall, said partition maintaining said top and bottom walls in substantially uniformly spaced relation despite the weight of said dish supported by said bottom wall.

4. In combination, a serving tray formed from foldable sheet material and having top, bottom, side and end walls, said top wall having a dish-receiving opening and being spaced above said bottom wall, a dish received within said opening and resting upon said bottom wall, partition means formed integrally with said bottom wall and permanently secured to the undersurface of said top wall adjacent said opening, and means provided by said top wall adjacent said opening for restraining lateral movement of said dish, said last-mentioned means comprising a plurality of tabs circumferentially spaced about said opening and having the free ends thereof engaging the sides of said dish.

5. The structure of claim 4 in which said tabs are foldable along fold lines spaced outwardly beyond the periphery of said opening.

6. A serving tray folded from a single sheet of board material and having top, bottom, side and end walls, said top wall having a dish-receiving opening therein and being spaced above said bottom wall, said bottom wall being formed in two sections secured together in overlapping relation along a line disposed directly beneath said opening, and a pair of longitudinally-elongated upstanding partitions disposed on opposite sides of said opening and having their outer ends terminating adjacent said end walls, said partitions being hingedly and permanently connected to both said top and bottom walls and being engageable with said end walls to maintain the same at right angles with reference to said top and bottom walls.

7. In combination, a serving tray formed from foldable sheet material and having top, bottom, side and end walls, said top wall having a dish-receiving opening and said top wall being maintained at a spaced distance above said bottom wall, a dish received within said opening and resting upon said bottom wall, and means provided by said top wall adjacent said opening for restraining lateral movement of said dish, said means comprising a plurality of tabs circumferentially spaced around said opening, said tabs having free ends extending inwardly beyond the edge of said opening and said tabs being foldable to a downwardly and inwardly inclined position from fold lines spaced outwardly beyond the edge of said opening, said free ends of said tabs engaging the sides of said dish when said tabs are in said downwardly and inwardly inclined position.

References Cited in the file of this patent
UNITED STATES PATENTS

| | | |
|---|---|---|
| 1,996,965 | Keppler | Apr. 9, 1935 |
| 2,640,589 | Foster et al. | June 2, 1953 |
| 2,670,124 | Buchmiller et al. | Feb. 23, 1954 |
| 2,744,675 | Crane | May 8, 1956 |
| 2,750,098 | Levkoff | June 12, 1956 |
| 2,808,191 | Cramer | Oct. 1, 1957 |